United States Patent [19]
Hamanaka

[11] Patent Number: 6,069,740
[45] Date of Patent: May 30, 2000

[54] PLANAR MICROLENS ARRAY AND METHOD OF MANUFACTURING SAME

[75] Inventor: Kenjiro Hamanaka, Kanagawa, Japan

[73] Assignee: Nippon Sheet Glass Co., Ltd., Osaka, Japan

[21] Appl. No.: 09/333,957

[22] Filed: Jun. 16, 1999

[30] Foreign Application Priority Data

Jun. 17, 1998 [JP] Japan .................................. 10-169821

[51] Int. Cl.$^7$ .................................................. G02B 27/10
[52] U.S. Cl. ............................................ 359/620; 359/623
[58] Field of Search .................... 359/620–623, 359/619, 618; 349/95, 116

[56] References Cited

U.S. PATENT DOCUMENTS 5,554,432   9/1996   Sandor et al. .......................... 428/157

*Primary Examiner*—Georgia Epps
*Assistant Examiner*—Younggil Timothy Lee
*Attorney, Agent, or Firm*—Pillsbury Madison & Sutro LLP

[57] ABSTRACT

A planar microlens array 1 includes an array of microlenses 3 made of a synthetic resin having a high refractive index and formed on a surface of one of a base glass plate 2 and a cover glass plate 4, and an adhesive layer 5 made of a synthetic resin having a low refractive index standing between the array of microlenses 3 and the other of the base glass plate 2 and the cover glass plate 4, wherein the equations (Eqs. 1–5) are satisfied, where, $n_1$ represents the refractive index of the synthetic resin having a high refractive index, $n_2$ represents the refractive index of the synthetic resin having a low refractive index, $t_1$ represents the thickness of the thickest portion of the sphere portion of the microlenses, $t_2$ represents said thickness of the rest portion of the microlenses and $t_3$ represents the thickness of the thinnest portion of the adhesive layer.

$1.59 \leq n_1 \leq 1.68$ (Eq. 1)

$1.38 \leq n_2 \leq 1.42$ (Eq. 2)

$5 \leq t_1 \leq 30$ ($\mu$m) (Eq. 3)

$t_2 \leq 6$ ($\mu$m) (Eq. 4)

$t_3 \geq 0.2\ t_1$ ($\mu$m) (Eq. 5)

2 Claims, 4 Drawing Sheets

PLANAR MICROLENS ARRAY AND METHOD OF MANUFACTURING SAME

BACKGROUND OF THE INVENTION

1. Field of the Invention

The present invention relates to a planar microlens array used in a liquid crystal display element and so on.

2. Description of the Related Art

Prior-art liquid crystal display elements in which a planar microlens array and a liquid crystal layer are combined are shown in FIG. 1(A) and FIG. 1(B) of the accompanying drawings. The liquid crystal display element shown in FIG. 1(A) includes a planar microlens array 1 comprising an array of convex microlenses 3 provided on a surface of a base glass plate 2. The array of convex microlenses 3 is covered with a cover glass plate 4 which is bonded to the array of convex microlenses 3 by an adhesive layer 5. A liquid crystal layer 7 is filled between the cover glass plate 4 and a TFT (Thin Film Transistor) glass substrate 6. The TFT glass substrate 6 supports transparent pixel electrodes 8 on its surface facing the liquid crystal layer 7. The surface of the TFT glass substrate 6 includes areas 9 that are free of the transparent pixel electrodes 8 and carry interconnections and TFTs which do not pass applied light. Electrodes 10 which confront the transparent pixel electrodes 8 are mounted on a surface of the cover glass plate 4 that faces the liquid crystal layer 7.

In the liquid crystal display element shown in FIG. 1(B), an array of convex microlenses 3 is provided on a surface of a cover glass plate 4.

A planar microlens array according to the present invention can be applied to both the liquid crystal display elements shown in FIG. 1(A) and FIG. 1(B).

The planar microlens array 1 operates as follows: Applied light is converged by the convex microlenses 3 onto the transparent pixel electrodes 8 to brighten an image projected onto a screen.

A process of manufacturing the planar microlens array 1, the structure of which is mentioned above, is as follows: As shown in FIG. 2(A), a release agent is coated on a shaping surface of a stamper 11 on which convex portions are densely arranged, and a light-curable or heat-curable synthetic resin material having a high refractive index is set on the shaping surface of the stamper 11. Next, as shown in FIG. 2(B), the base glass plate 2 is pushed onto the synthetic resin material, thereby spreading the synthetic resin material, and the synthetic resin material is cured by applying ultraviolet radiation or heating and is shaped to form the convex microlenses 3. Thereafter the stamper 11 is peeled off.

Next, as shown in FIG. 2(C), a light-curable or heat-curable synthetic resin material having a low refractive index is coated onto the convex microlenses 3, and a glass substrate which is made into a cover glass plate 4 is pushed onto the synthetic resin material, thereby spreading the same. Thereafter, the synthetic resin material is cured and finally the planar microlens array 1 is formed by grinding the glass substrate to the thickness of the cover glass plate 4.

The convex microlenses may be formed on the glass substrate.

Presently available liquid crystal display panels have pixel dimensions ranging from about 40 μm to 60 μm. It is expected that the pixel dimensions will be reduced to about 20 μm to 30 μm in the future to meet demands for clearer displayed images.

Smaller pixel dimensions require the convex microlenses 3 to be reduced in size, resulting in a shorter focal length. For efficient utilization of the applied light, it is necessary that the focal point of the convex microlenses 3 be positioned substantially on the transparent pixel electrodes. To meet such a requirement, the cover glass plate 4 must be reduced in thickness.

Each of the convex microlenses 3 and the adhesive layer 5 is made of a heat-curable or ultraviolet-curable synthetic resin. The synthetic resin shrinks when cured. In particular, the synthetic resin having a high refractive index which makes the convex microlenses 3 has high Young's modulus and high residual stress.

The cover glass plate 4 can withstand the shrinkage of the synthetic resin, provided that the cover glass plate 4 has a substantial thickness. However, if the cover glass plate 4 is thinner, it tends to yield and allow the entire planar microlens array 1 to warp upon shrinkage of the synthetic resin, as shown in FIG. 3 of the accompanying drawings. In particular, shrinkage of the synthetic resin having a high refractive index may result in high residual stress. As a result of this, the width of a cell gap which is formed between the planar microlens array 1 and the TFT glass substrate 6 and to which liquid crystal is applied varies between the center and the periphery. Presently the maximum permissible error range of a cell gap in size is 1.5 μm.

On the other hand, the Young's modulus of the synthetic resin having a low refractive index which makes the adhesive layer 5 is smaller than that of the synthetic resin having a high refractive index which makes the convex microlenses 3. That does not mainly cause the warpage but does mainly cause the small voids.

Namely, as shown in FIG. 4, small voids are produced between the convex microlenses 3 and the adhesive layer 5 because the volume shrinkage percentage of the synthetic resin having a low refractive index generally reaches to 6–9%, and further the synthetic resin having a low refractive index has small values in membrane intensity and interface adhesion intensity.

SUMMARY OF THE INVENTION

To solve the above-mentioned problems, the inventors of the present invention tested the cause, the incident amount or the like with regard to warpage and small voids.

FIGS. 5(A) and 5(B) show the relation between thickness and warpage of convex microlenses 3 which comprise a synthetic resin having a high refractive index. In the case shown in FIG. 5(A), the thickness of convex microlenses 3 is small. In a case shown in FIG. 5(B), a thickness thereof is large. A thickness of an adhesive layer 5 which comprises a synthetic resin having a low refractive index is equal in both cases.

It became clear that residual stress and amount of warpage are smaller in the case shown in FIG. 5(A) than in FIG. 5(B).

In the above-mentioned manufacturing method using a stamper, in addition to a sphere portion 3a which functions as a lens, a rest portion 3b needs to be formed in the convex microlenses 3 to prevent damage to the stamper. The amount of warpage is determined by the sum of the thickness $t_1$ of the sphere portion 3a and the thickness $t_2$ of the rest portion 3b ($t_1+t_2$).

FIGS. 6(A) and 6(B) show the relation between a thickness of an adhesive layer 5 comprised of a synthetic resin having a low refractive index, and small voids. In a case shown in FIG. 6(A), a thickness of the adhesive layer 5 is thin. In a case shown in FIG. 6(B), the thickness thereof is thick. The thickness of convex microlenses 3 comprised of a synthetic resin having a high refractive index is equal in both cases.

It became clear that the larger the ratio of the thickness $t_3$ of the thinnest portion of the adhesive layer 5 to the thickness $t_4$ of the thickest portion thereof ($t_4/t_3$) is, the easier it is to produce small voids.

In addition, in the cases shown in FIG. 5(A) and FIG. 5(B), even if thickness of the adhesive layer 5 is equal, small voids are easier to produce in a case where the thickness of the convex microlenses 3 is thick than in a case where the thickness thereof is thin.

Pixel dimensions of liquid crystal display panels are determined within 14–60 μm. A epoxy resin having a refractive index ($n_1$) of 1.59–1.68 is used as a synthetic resin having a high refractive index. A fluoro epoxy resin or a fluoro acrylic resin having a refractive index ($n_2$) of 1.38–1.42 is used as a synthetic resin having a low refractive index.

When pixel dimensions of liquid crystal display panels are determined, a focal length of a lens is automatically determined. When a focal length of a lens and a kind of a synthetic resin having a high refractive index are determined, a thickness ($t_1$) of a sphere portion of a convex lens is automatically determined.

A thickness ($t_1$) of a sphere portion varies according to differences in pixel dimensions, a kind of a synthetic resin and so on. However, generally it is within the scope of $5 \leq t_1 \leq 30$ (μm).

As a result, among elements which take part in causing warpage and small voids, including a thickness ($t_1$) of a sphere portion of a convex lens, a thickness ($t_2$) of a rest portion and a thickness $t_3$ of the thinnest portion of an adhesive layer, the thickness ($t_1$) of a sphere portion is determined by another element. Therefore, the thickness ($t_2$) of a rest portion and the thickness $t_3$ of the thinnest portion of an adhesive layer have room for adjustment.

According to the present invention, optical variations in a case where each thickness $t_1$, $t_2$ and $t_3$ mentioned above is made to vary, and room for adjustment in the thickness $t_2$ and $t_3$ are watched, and the most suitable conditions are estimated thereby.

A planar microlens array includes an array of microlenses made of a synthetic resin having a high refractive index and formed on a surface of one of a base glass plate and a cover glass plate, and a adhesive layer made of a synthetic resin having a low refractive index standing between the array of microlenses and the other of the base glass plate and the cover glass plate, wherein the equations (Eqs. 1–5) are satisfied, where, $n_1$ represents the refractive index of said synthetic resin having a high refractive index, $n_2$ represents the refractive index of said synthetic resin having a low refractive index, $t_1$ represents the thickness of the thickest portion of the sphere portion of said microlenses, $t_2$ represents the thickness of the rest portion of said microlenses and $t_3$ represents said thickness of the thinnest portion of said adhesive layer.

$$1.59 \leq n_1 \leq 1.68 \quad \text{(Eq. 1)}$$

$$1.38 \leq n_2 \leq 1.42 \quad \text{(Eq. 2)}$$

$$5 \leq t_1 \leq 30 \, (\mu m) \quad \text{(Eq. 3)}$$

$$t_2 \leq 6 \, (\mu m) \quad \text{(Eq. 4)}$$

$$t_3 \geq 0.2 \, t_1 \, (\mu m) \quad \text{(Eq. 5)}$$

In addition, it is preferable to satisfy the relation expressed by $10 \leq t_1+t_2+t_3 \leq 60$ (μm) because a necessary focal length cannot be obtained in a case where the value of $t_1+t_2+t_3$ is smaller than 10 μm, and warpage is produced in a case where it is larger than 60 μm.

DETAILED DESCRIPTION OF THE PREFERRED EMBODIMENTS

Embodiment 1

Figure 1:
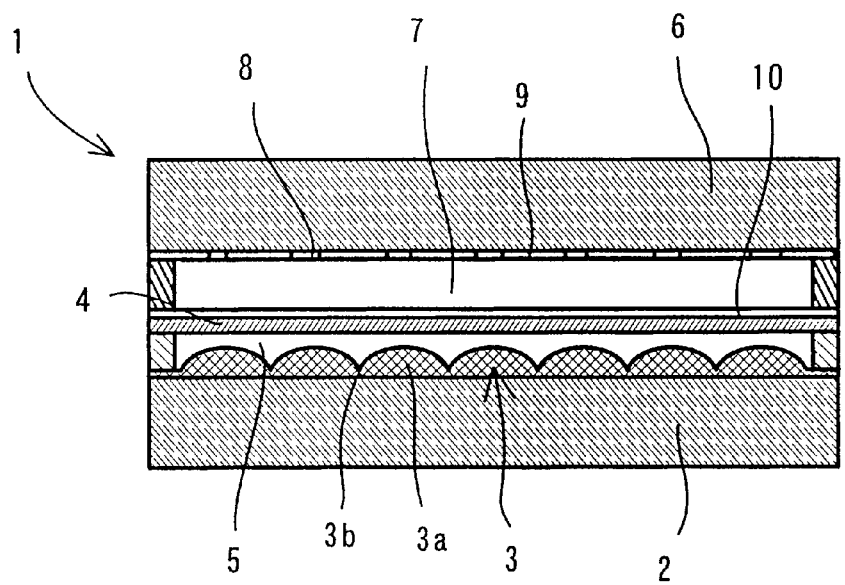
FIGS. 1 (A) and (B) are cross-sectional views of a conventional liquid crystal display panel.
Figure 1:
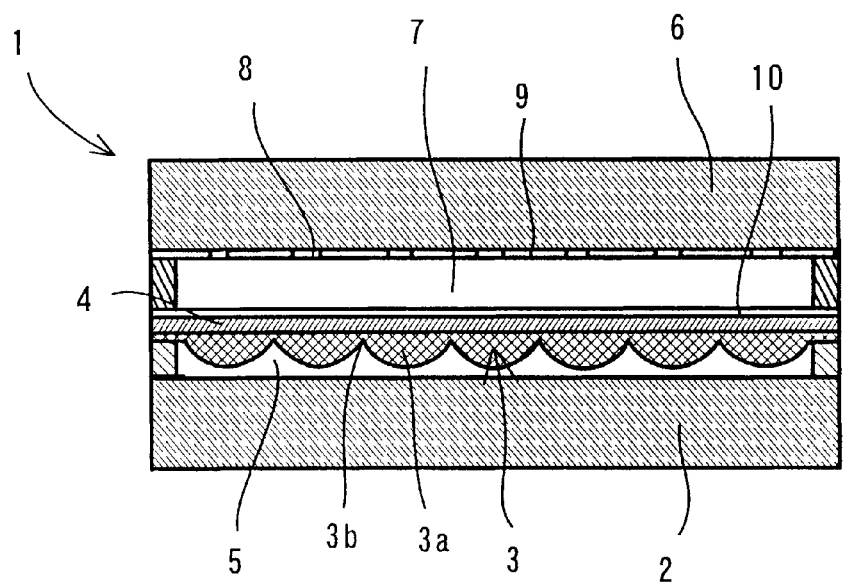
Figure 2:
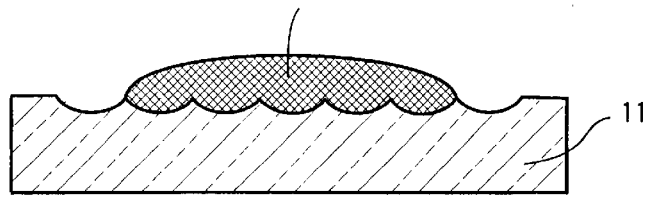
FIGS. 2 (A)–(C) illustrate a process of manufacturing the planar microlens array using a stamper.
Figure 2:
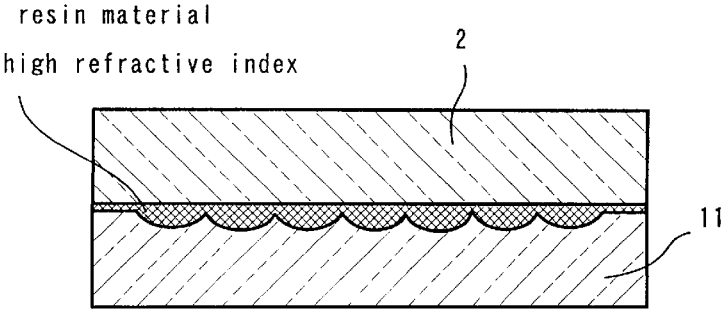
Figure 2:
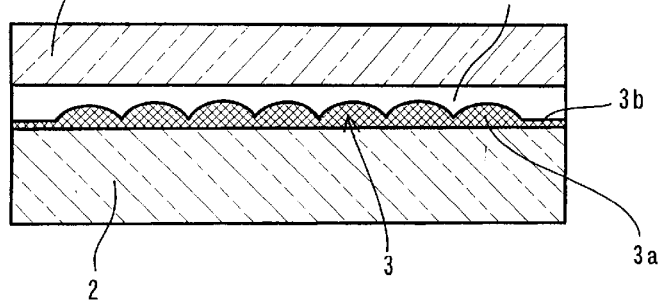
Figure 3:
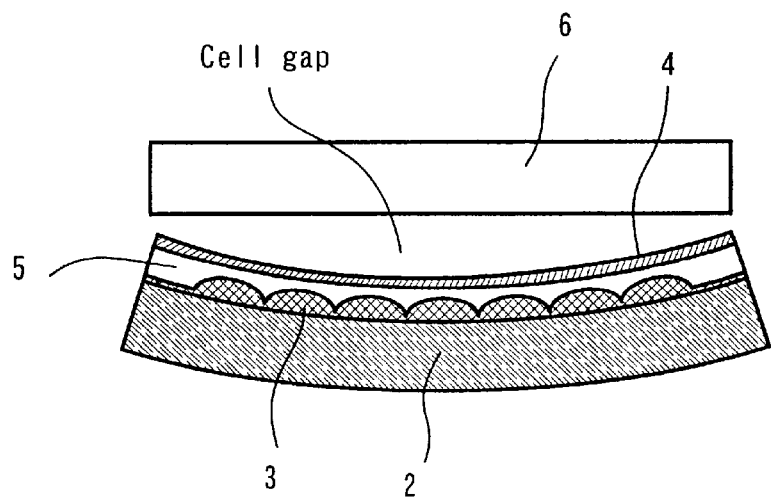
FIG. 3 is a cross-sectional view showing the manner in which the conventional planar microlens array is warped.
Figure 4:
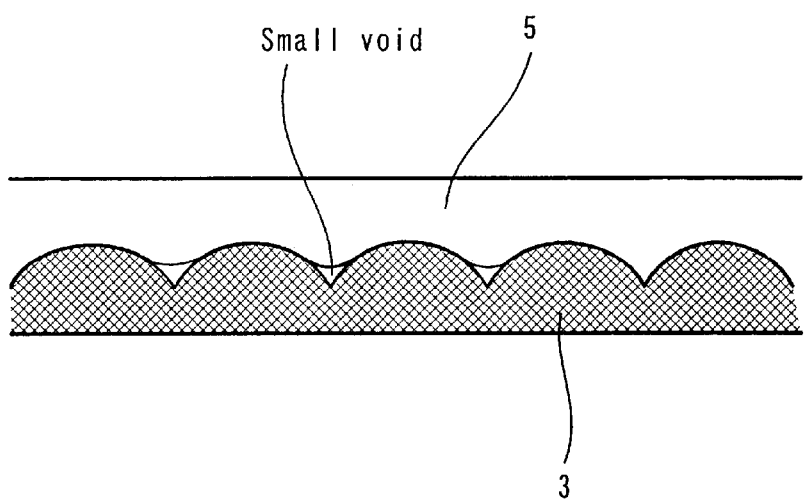
FIG. 4 is a cross-sectional view showing the manner in which small voids are produced in the conventional planar microlens array.
Figure 5:
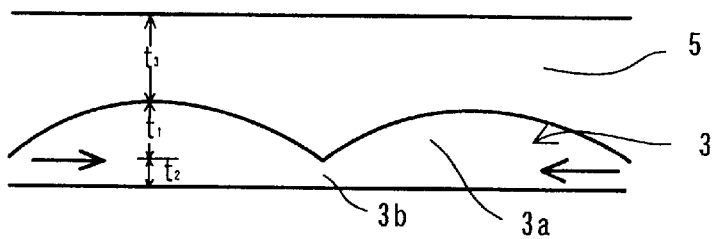
FIGS. 5 (A) and (B) show the relation between a thickness of the microlenses and a warpage in the planar microlens array.
Figure 5:
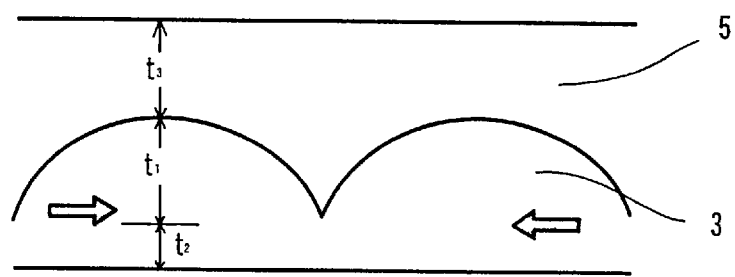
Figure 6:
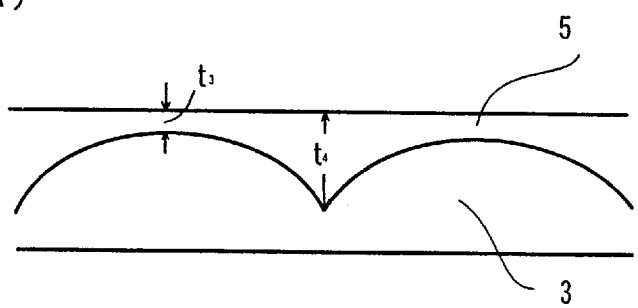
FIGS. 6 (A) and (B) show the relation between a thickness of the adhesive layer and small voids in the planar microlens array.
Figure 6:
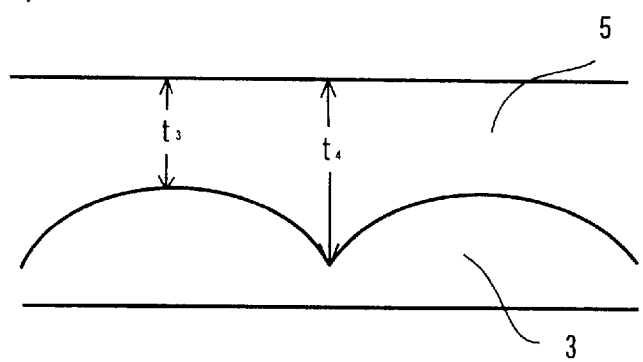

The base glass plate has a thickness of 0.95 mm, the cover glass plate has a thickness of 0.15 mm, the base glass plate and the cover glass plate have dimensions of 27×20 mm, the lenses are arranged squarely and densely, a pitch of the lenses is 32 μm, a refractive index ($n_1$) of the synthetic resin having a high refractive index which makes up the lenses is 1.59, a refractive index ($n_2$) of the synthetic resin having a low refractive index which makes up the adhesive layer is 1.38, a thickness ($t_1$) of a sphere portion of the lenses is 10 μm, a thickness ($t_3$) of the thinnest portion of the adhesive layer is 10 μm and a thickness ($t_2$) of a rest portion of the microlenses is made to vary.

The relation between $t_2$ and an amount of warpage (μm) is shown in TABLE 1.

TABLE 1

| $t_2$ (μm) | Amount of warpage (μm) |
|---|---|
| 2 | 0.62 |
| 3 | 0.89 |
| 4 | 1.20 |
| 5 | 1.43 |
| 6 | 1.50 |
| 7 | 1.78 |
| 8 | 2.15 |
| 9 | 2.37 |
| 10 | 2.62 |
| 11 | 2.81 |
| 12 | 3.08 |

As mentioned above, presently the permissible warpage is below 1.5 μm with regard to a planar microlens array.

As shown in TABLE 1, it is required that $t_2$ be below 6 μm in order that the amount of warpage is below 1.5 μm.

Embodiment 2

A thickness ($t_2$) of a rest portion of the microlenses is fixed at 3 μm and the other conditions are the same as EMBODIMENT 1. A thickness ($t_1$) of a sphere portion of the microlenses and a thickness ($t_3$) of the thinnest portion of the adhesive layer are made to vary.

The relation between $t_3$ and an amount of warpage (μm) is shown in TABLE 2.

TABLE 2

| $t_3$ ($t_1$ = 10) | Small voids | $t_3$ ($t_1$ = 15) | Small voids | $t_3$ ($t_1$ = 20) | Small voids |
|---|---|---|---|---|---|
| 1 | X | 1 | X | 1 | X |
| 2 | ○ | 2 | ○ | 2 | ○ |
| 3 | ○ | 3 | ○ | 3 | ○ |
| 4 | ○ | 4 | ○ | 4 | ○ |
| 5 | ○ | 5 | ○ | 5 | ○ |
| 6 | ◉ | 6 | ○ | 6 | ○ |
| 7 | ◉ | 7 | ◉ | 7 | ○ |
| 8 | ◉ | 8 | ◉ | 8 | ◉ |
| 9 | ◉ | 9 | ◉ | 9 | ◉ |
| 10 | ◉ | 10 | ◉ | 10 | ◉ |
| 11 | ◉ | 11 | ◉ | 11 | ◉ |

X . . . Small voids were produced all over.
○ . . . Small voids were produced only in the periphery of the lens.
◉ . . . No small void was produced.

As shown in TABLE 2, it becomes clear that no small void is produced in a case of $t_3 \geq 0.2\, t_1$ (μm).

As mentioned above, according to the present invention, in a planar microlens array manufactured using a stamper, it is possible to effectively prevent a warpage and small voids from arising by making the relation among a thickness ($t_1$) of the thickest portion of a sphere portion of the microlenses, a thickness ($t_2$) of a rest portion of the microlenses and a thickness ($t_3$) of the thinnest portion of the adhesive layer satisfy the equations, $5 \leq t_1 \leq 30$ (μm), $t_2 \leq 6$ (μm) and $t_3 \geq 0.2\, t_1$ (μm).

What is claimed is:

1. A planar microlens array comprised of an array of microlenses made of a synthetic resin having a high refractive index and formed on a surface of one of a base glass plate and a cover glass plate and an adhesive layer made of a synthetic resin having a low refractive index provided between the array of microlenses and the base glass plate and the cover glass plate, wherein the equations (Eqs. 1–5) are satisfied, where $n_1$ represents the refractive index of said synthetic resin having a high refractive index, $n_2$ represents the refractive index of said synthetic resin having a low refractive index, $t_1$ represents a thickness of a thickest portion of a sphere portion of said microlenses, $t_2$ represents a thickness of a rest portion of said microlenses and $t_3$ represents a thickness of a thinnest portion of said adhesive layer.

$$1.59 \leq n_1 \leq 1.68 \quad \text{(Eq. 1)}$$

$$1.38 \leq n_2 \leq 1.42 \quad \text{(Eq. 2)}$$

$$5 \leq t_1 \leq 30\ (\mu m) \quad \text{(Eq. 3)}$$

$$t_2 \leq 6\ (\mu m) \quad \text{(Eq. 4)}$$

$$t_3 \geq 0.2\, t_1\ (\mu m) \quad \text{(Eq. 5)}$$

2. A planar microlens array according to claim 1 wherein the equation 6 is also satisfied.

$$10 \leq t_1 + t_2 + t_3 \leq 60\ (\mu m) \quad \text{(Eq. 6)}$$

* * * * *